United States Patent [19]

Kiovsky

[11] 4,077,893

[45] Mar. 7, 1978

[54] STAR-SHAPED DISPERSANT VISCOSITY INDEX IMPROVER

[75] Inventor: Thomas E. Kiovsky, Houston, Tex.

[73] Assignee: Shell Oil Company, Houston, Tex.

[21] Appl. No.: 795,676

[22] Filed: May 11, 1977

[51] Int. Cl.$^2$ .................... C10M 1/28; C08L 9/06; C08L 47/00
[52] U.S. Cl. .................... 252/56 R; 252/560; 260/880 B; 260/879
[58] Field of Search .................... 252/56 R, 56 D; 260/880 B, 879

[56] References Cited

U.S. PATENT DOCUMENTS

| | | |
|---|---|---|
| 3,694,523 | 9/1972 | Rollman et al. .................... 260/879 |
| 3,943,086 | 3/1976 | Schein et al. .................... 260/879 |
| 4,033,888 | 7/1977 | Kiovsky .................... 252/56 |
| 4,033,889 | 7/1977 | Kiovsky .................... 252/56 |

*Primary Examiner*—Delbert E. Gantz
*Assistant Examiner*—J. Thierstein
*Attorney, Agent, or Firm*—Dean F. Vance

[57] ABSTRACT

Lubricating oil additives having both dispersant and viscosity index-improving properties are prepared by reacting a selectively hydrogenated star-shaped polymer having at least four arms of polymers or copolymers of dienes and monoalkenyl arenes with an alpha-beta unsaturated carboxylic acid or derivative, and then reacting the resulting intermediate with an alkane polyol.

14 Claims, No Drawings

STAR-SHAPED DISPERSANT VISCOSITY INDEX IMPROVER

BACKGROUND OF THE INVENTION

The newer engines place increased demands on the lubricants to be employed. In the past a number of different additives have been added to lubricating oils to improve such properties as viscosity index and dispersancy. One additive added to lubricating oils to improve viscosity index is a two-block copolymer having the general configuration A—B where A is styrene and B is hydrogenated isoprene. See generally U.S. Pat. Nos. 3,763,044 and 3,772,196. A VI improver having greatly improved mechanical shear stability is the selectively hydrogenated star-shaped polymer disclosed in the copending patent application by Rudolf J. Eckert, entitled "Hydrogenated Star-Shaped Polymer," Ser. No. 762,211, filed Jan. 24, 1977, having a common assignee. Significant reductions in cost can be made by employing a single additive that improves a number of lubricant properties. However, in attempting to improve more than a single lubricant property, care must be taken in not causing the deterioration of other properties. For example, by employing an oxidation step to attach polar groups to the polymer backbone in U.S. Pat. No. 3,864,268, the patentees have reduced lubricant stability by introducing cities for oxidative attack.

SUMMARY OF THE INVENTION

Ashless, oil-soluble additives having both dispersant and viscosity-index (VI) improving properties are prepared by the process comprising:
(a) reacting a selectively hydrogenated star-shaped polymer with an alpha-beta unsaturated carboxylic acid, anhydride or ester at a temperature of between about 150° C and about 300° C, for between about 1 hour and about 20 hours wherein said star-shaped polymer comprises a poly (polyalkenyl coupling agent) nucleus, and at least four polymeric arms linked to said nucleus wherein said polymeric arms are selected from the group consisting of:
  (i) hydrogenated homopolymers and hydrogenated copolymers of conjugated dienes;
  (ii) hydrogenated copolymers of conjugated dienes and monoalkenyl arenes; and
  (iii) mixtures thereof;
and wherein at least about 80% of the alphatic unsaturation of the star-shaped polymer has been reduced by hydrogenation while less than 20% of the aromatic unsaturation has been reduced; and
(b) reacting the product of step (a) with an alkane polyol having at least two hydroxy groups at a temperature of between about 150° C and about 250° C.

In an alternative embodiment, the reaction between the star-shaped polymer and the carboxylic acid or derivative takes place after the chlorination of the polymer or in the presence of chlorine, as more fully explained below.

The dispersant VI improvers of the present invention possess excellent viscosity improving properties, oxidative stability, mechanical shear stability, and dispersancy. In particular, the lubricating oils containing the instant VI improver/dispersants possess excellent thickening efficiency at high temperature while also possessing very good low temperature viscosity characteristics. Importantly, by employing the instant VI improver/dispersants, as opposed to the prior art VI improvers, a lower amount of polymer is required in order to obtain the required thickening performance. Further, the instant polymers not only possess much superior oxidative shear stability and permanent shear stability, they also possess significantly improved "temporary shear loss." Temporary shear loss refers to the temporary viscosity loss at high shear stress conditions resulting from the non-Newtonian character of the polymeric VI improvers. Still further, the dispersing power of the instant polymeric additive is excellent, as shown in the accompanying Illustrative Embodiments. This combination of desirable properties has never before been obtainable in a single additive.

Detailed Description of the Invention

1. Preparation of the Base Polymer — The base polymer employed in making the present dispersant VI improvers is a star polymer. These polymers are generally produced by the process comprising the following reaction steps:
  (a) polymerizing one or more conjugated dienes and, optionally, one or more monoalkenyl arene compounds, in solution, in the presence of an ionic initiator to form a living polymer;
  (b) reacting the living polymer with a polyalkenyl coupling agent to form a star-shaped polymer; and
  (c) hydrogenating the star-shaped polymer to form a hydrogenated star-shaped polymer.

The living polymers produced in reaction step (a) of the present process are the precursors of the hydrogenated polymer chains which extend outwardly from the poly(polyalkenyl coupling agent) nucleus.

As is well-known, living polymers may be prepared by anionic solution polymerization of conjugated dienes and, optionally, monoalkenyl arene compounds in the presence of an alkali metal or an alkali-metal hydrocarbon, e.g., sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums and in particular the alkyl lithiums such as methyllithium, ethyllithium, propyllithium, butyllithium, amyllithium, hexyllithium, 2-ehtylhexyllithium and n-hexadecyllithium. Secondary-butyllithium is the preferred initiator. The initiators may be added to the polymerization mixture in two or more stages optionally together with additional monomer. The living polymers are olefinically and, optionally, aromatically unsaturated.

The living polymers obtained by reaction step (a), which are linear unsaturated living polymers, are prepared from one or more conjugated dienes, e.g., $C_4$ to $C_{12}$ conjugated dienes and, optionally, one or more monoalkenyl arene compounds.

Specific examples of suitable conjugated dienes include butadiene(1,3-butadiene); isoprene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene being preferred. Apart from the one or more conjugated dienes the living polymers may also be partly derived from one or more monoalkenyl arene compounds. Preferred monoalkenyl arene compounds are the monovinyl aromatic compounds such as styrene, monovinylnaphthalene as well as the alkylated derivatives thereof such as o-, m- and p-methylstyrene, alpha-methylstyrene and tertiary-butylstyrene. Styrene is the preferred monoalkenyl arene compound. The living polymers may also be partly derived from small amounts of other monomers such as monovinylpyridines, alkyl esters of acrylic and methacrylic acids (e.g., methyl methacrylate, dodecyclmethacrylate, octadecyclmethacrylate), vinyl chloride, vinylidene chloride, monovinyl esters of carboxylic acids (e.g., vinyl acetate and vinyl stearate). Preferably, the living polymers are derived entirely from hydrocarbon monomers. If a monoalkenyl arene compound is used in the preparation of the living polymers it is preferred that the amount thereof be below about 50% by weight, preferably about 3 to about 50%.

The living polymers may be living homopolymers, living copolymers, living terpolymers, living tetrapolymers, etc. The living homopolymers may be represented by the formula A—M, wherein M is a ionic group, e.g., lithium, and A is polybutadiene or polyisoprene. Living polymers of isoprene are the preferred living homopolymers. The living copolymers may be represented by the formula A—B—M, wherein A—B is a block, random or tapered copolymer such as poly(butadiene/isoprene), poly(butadiene/styrene) or poly(isoprene/styrene). Such formulae, without further restriction, do not place a restriction on the arrangement of the monomers within the living polymers. For example, living poly(isoprene/stryrene) copolymers may be living polyisoprene-polystyrene block copolymers, living polystyrene-polyisoprene block copolymers, living poly(isoprene/styrene) random copolymers, living poly(isoprene/styrene)tapered copolymers or living poly(isoprene/styrene/isoprene)block copolymers. As an example of a living terpolymer may be mentioned living poly(butadiene/styrene/isoprene)terpolymers.

As stated above, the living copolymers may be living block copolymers, living random copolymers or living tapered copolymers. The living block copolymers may be prepared by the step-wise polymerization of the monomers, e.g., by polymerizing isoprene to form living polyisoprene followed by the addition of the other monomer, e.g., styrene, to form a living block copolymer having the formula polyisoprene-polystyrene-M, or styrene may be polymerized first to form living polystyrene followed by addition of isoprene to form a living block copolymer having the formula polystyrene-polyisoprene-M.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. Living tapered copolymers of butadiene and isoprene are preferred living tapered polymers.

Since the living polymers produced in reaction step (a) of the above process are the precursors of the hydrogenated polymer chains which extend outwardly from the poly(polyalkenyl coupling agent)nucleus, it can be seen that the preferred hydrogenated polymer chains are hydrogenated polybutadiene chains, hydrogenated polyisoprene chains, hydrogenated poly(butadiene/isoprene)chains, hydrogenated poly(butadiene/styrene)-chains and hydrogenated poly(isoprene/styrene)chains.

The solvents in which the living polymers are formed are inert liquid solvents such as hydrocarbons, e.g., aliphatic hydrocarbons, such as pentane, hexane, heptane, octane, 2-ethylhexane, nonane, decane, cyclohexane, methylcyclohexane or aromatic hydrocarbons, e.g., benzene, toluene, ethylbenzene, the xylenes, diethylbenzenes, propylbenzenes. Cyclohexane is preferred. Mixtures of hydrocarbons, e.g., lubricating oils may also be used.

The temperature at which the polymerization is carried out may vary between wide limits such as from −50° to 150° C, preferably from about 20° to about 80° C. The reaction is suitably carried out in an inert atmosphere such as nitrogen and may be carried out under pressure, e.g., a pressure of from about 0.5 to about 10 bars.

The concentration of the initiator used to prepare the living polymer may also vary between wide limits and is determined by the desired molecular weight of the living polymer.

The molecular weight of the living polymers prepared in reaction step (a) may vary between wide limits. Suitable number average molecular weights are from about 5,000 to about 150,000 with number average molecular weights of from about 15,000 to about 100,000 being preferred. Consequently, the number average molecular weight of the hydrogenated polymer chains of the final star-shaped polymer may also vary between these limits.

The living polymers produced in reaction step (a) are then reacted, in reaction step (b), with a polyalkenyl coupling agent. Polyalkenyl coupling agents capable of forming star-shaped polymers are known. See generally, Fetters et al., U.S. Pat. No. 3,985,830; Milkovich, Canadian Pat. No. 716,645; and British Pat. No. 1,025,295. They are usually compounds having at least two non-conjugated alkenyl groups. Such groups are usually attached to the same or different electronwithdrawing groups, e.g., an aromatic nucleus. Such compounds have the property that at least two of the alkenyl groups are capable of independent reaction with different living polymers and in this respect are different from conventional conjugated diene polymerizable monomers such as butadiene, isoprene etc. Pure or technical grade polyalkenyl coupling agents may be used. Such compounds may be aliphatic, aromatic or heterocyclic. Examples of aliphatic compounds include the polyvinyl and polyallyl acetylenes, diacetylenes, phosphates and phosphites as well as the dimethacrylates, e.g., ethylene dimethyacrylate. Examples of suitable heretocyclic compounds include divinyl pyridine and divinyl thiophene. The preferred coupling agents are the polyalkenyl aromatic compounds and the most preferred are the polyvinyl aromatic compounds. Examples of such compounds include those aromatic compounds, e.g., benzene, toluene, xylene, anthracene, naphthalene and durene which are substituted by at least two alkenyl groups preferbly directly attached thereto. Examples include the polyvinyl benzenes, e.g., divinyl, trivinyl and tetravinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene and diisopropenyl biphenyl. The preferred aromatic compounds are represented by the formula: A—(CH=CH$_2$)$_x$ wherein A is an optionally substituted aromatic nucleus and $x$ is an integer of at least 2. Divinyl benzene, in particular meta-divinyl benzene, is the most preferred aromatic compound. Pure or technical grade divinylbenzene (containing various amounts of other monomers, e.g., styrene and ethyl styrene) may be used. The coupling agents may be used in admixture with small amounts of added monomers which increase the size of the nucleus, e.g., styrene or alkylated styrene. In this case, the nucleus may be described as a poly(-dialkenyl coupling agent/monoalkenyl aromatic compound)nucleus, e.g., a poly(divinylbenzene/monoalkenyl aromatic compound)nucleus. From the above it will be clear that the term divinylbenzene when used to describe the nucleus means either purified or technical grade divinyl benzene.

The polyalkenyl coupling agent should be added to the living polymer after the polymerization of the monomers is substantially complete, i.e., the agent should only be added after substantially all of the monomer has been converted to living polymers.

The amount of polyalkenyl coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85%w of the living polymers into star-shaped polymers.

The reaction step (b) may be carried out in the same solvent as for reaction step (a). A list of suitable solvents is given above. The reaction step (b) temperature may also vary between wide limits e.g., from 0° to 150° C, preferably from 20° to 120° C. The reaction may also take place in an inert atmosphere, e.g., nitrogen and under pressure, e.g., a pressure of from 0.5 to 10 bars.

The star-shaped polymers prepared in reaction step (b) are characterized by having a dense center or nucleus of cross-linked poly(polyalkenyl coupling agnet) and a number of arms of substantially linear unsaturated polymers extending outwardly therefrom. The number of arms may vary considerably but is typically between 4 and 25, preferably from about 7 to about 15. Star-shaped homopolymers may be represented by the formula A—$x$—(A)$_n$ and star-shaped copolymers may be represented by the formula A—B—$x$—(B—A)$_n$ wherein $n$ is an integer, usually between 3 and 24 and $x$ is the poly(polyalkenyl coupling agent)nucleus. From the above it can be seen that $x$ is preferably a poly(polyvinyl aromatic coupling agent)nucleus and more preferably a poly(divinylbenzene)nucleus. As stated above it is believed that the nuclei are cross-linked.

It has been found that the greater number of arms employed in the instant invention significantly improve both the thickening efficiency and the shear stability of the polymer since it is then possible to prepare a VI improver having a high molecular weight (resulting in increased thickening efficiency) without the necessity of excessively long arms (resulting in improved shear stability).

Such star-shaped polymers, which are still "living," may then be deactivated or "killed," in known manner, by the addition of a compound which reacts with the carbanionic end group. As examples of suitable deactivators may be mentioned, compounds with one or more active hydrogen atoms such as water, alcohols (e.g., methanol, ethanol, isopropanol, 2-ethylhexanol) or carboxylic acids (e.g., acetic acid), compounds with one active halogen atom, e.g., a chlorine atom (e.g., benzyl chloride, chloromethane), compounds with one ester group and carbon dioxide. If not deactivated in this way, the living star-shaped polymers will be killed by the hydrogenation step (c).

However, before being killed, the living star-shaped polymers may be reacted with further amounts of monomers such as the same or different dienes and/or monoalkenyl arene compounds of the types discussed above. The effect of this additional step, apart from increasing the number of polymer chains, is to produce a further living star-shaped polymer having at least two different types of polymer chains. For example, a living star-shaped polymer derived from living polyisoprene may be reacted with further isoprene monomer to produce a further living star-shaped polymer having polyisoprene chains of different number average molecular weights. Alternatively, the living star-shaped polyisoprene homopolymer may be reacted with styrene monomer to produce a further living star-shaped copolymer having both polyisoprene and polystyrene homopolymer chains. Thus it can be seen that by different polymer chains is meant chains of different molecular weights and/or chains of different structures. These further polymerizations may take place under substantially the same conditions as described for reaction step (a) of the process. The additional chains may be homopolymer, copolymer chains, etc., as described above.

The molecular weights of the star-shaped polymer to be hydrogenated in reaction step (c) may vary between relatively wide limits. However, an important aspect of the present invention is that polymers possessing good shear stability may be produced even though the polymers have very high molecular weights. It is possible to produce star polymers having peak molecular weights between about 25,000 and about 1,250,000. Preferred molecular weights are 100,000 to 500,000. These peak molecular weights are determined by gel permeation chromatography (GPC) on a polystyrene scale.

In step (c), the star-shaped polymers are hydrogenated by any suitable technique. Suitably at least 80%, preferably 90 to about 98% of the original olefinic unsaturation is hydrogenated. If the star-shaped polymer is partly derived from a monoalkenyl arene compound, then the amount of aromatic unsaturation which is hydrogenated, if any, will depend on the hydrogenation conditions used. However, preferably less than 20%, more preferably less than 5% of such aromatic unsaturation is hydrogenated. If the poly(polyalkenyl coupling agent) nucleus is a poly(polyalkenyl aromatic coupling agent) nucleus, then the aromatic unsaturation of the nucleus may or may not be hydrogenated again depending upon the hydrogenation conditions used. The molecular weights of the hydrogenated star-shaped polymers correspond to those of the unhydrogenated star-shaped polymers.

The hydrogenation can be carried out in any desired way. A hydrogenation catalyst may be used, e.g., a copper or molybdenum compound. Compounds containing noble metals or noble-metal compounds can be used as hydrogenation catalysts. Preference is given to catalysts containing a non-noble metal or a compound thereof of Group VIII of the Periodic Table, i.e., iron, cobalt and in particular, nickel. As examples may be mentioned, Raney nickel and nickel on kieselguhr. Special preference is given to hydrogenation catalysts which are obtained by causing metal hydrocarbyl compounds to react with organic compounds of any one of the group VIII metals iron, cobalt or nickel, the latter compounds containing at least one organic compound which is attached to the metal atom by means of an oxygen atom, for instance as described in U.K. patent specification No. 1,030,306. Preference is given to hydrogenation catalysts obtained by causing an aluminum trialkyl (e.g., aluminum triethyl (Al(Et)$_3$) or aluminum triisobutyl) to react with a nickel salt of an organic acid (e.g., nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g., nickel acetonylacetonate or the nickel salt of butylacetophenone).

The hydrogenation of the star-shaped polymer is very suitably conducted in solution in a solvent which is inert during the hydrogenation reaction. Saturated hydrocarbons and mixtures of saturated hydrocarbons are very suitable and it is of advantage to carry out the hydrogenation in the same solvent in which the polymerization has been effected.

A much preferred hydrogenation process is the selective hydrogenation process shown in Wald et al., U.S. Pat. No. 3,595,942. In that process, hydrogenation is conducted, preferably in the same solvent in which the polymer was prepared, utilizing a catalyst comprising the reaction product of an aluminum alkyl and a nickel or cobalt carboxylate or alkoxide. A favored catalyst is the reaction product formed from triethyl aluminum and nickel octoate.

The hydrogenated star-shaped polymer is then recovered in solid form from the solvent in which it is hydrogenated by any convenient technique such as by evaporation of the solvent. Alternatively, an oil, e.g., a lubricating oil, may be added to the solution and the solvent stripped off from the mixture so formed to produce concentrates. Easily handleable concentrates are produced even when the amount of hydrogenated star-shaped polymer therein exceeds 10%w. Suitable concentrates contain from 10 to 25%w of the hydrogenated star-shaped polymer.

2. Introduction of Sites for Dispersant Activity — The selectively hydrogenated star polymers as prepared above do not have adequate dispersancy characteristics by themselves. Therefore, the base polymer must be derivatized as explained below.

The star polymer is first reacted with an unsaturated carboxylic acid or derivative thereof. By "derivative thereof" is meant anhydrides, esters and the like. Suitable unsaturated acids and derivatives include maleic acid, maleic anhydride, itaconic acid, dimethyl itaconate, acrylic acid, ethyl acrylate, methyl methacrylate, oleic acid, linoleic acid, etc. The preferred acidic compounds are those containing alphabeta unsaturation. Maleic anhydride is especially preferred.

The carboxylic compound and the star polymer are reacted together at a temperature of between about 150° C and about 300° C, preferbly between about 180° C and about 250° C. The contacting time is between about 1 hour and about 24 hours, preferably between about 4 hours and about 12 hours. The carboxylic compound reacts with the residual olefinic bonds available on the diene portion of the polymer. When the carboxylic compound employed is maleic anhydride, usually about 10 to 100%, preferably 50 to 95% of the residual double bonds in the polymer are converted to succinic anhydride groups.

Various solvents may be employed in the carboxylic acid derivative addition step including generally olefinfree petroleum hydrocarbons, aromatics and halogenated hydrocarbons. A preferred solvent is a lubricating oil basestock. A much-preferred solvent is trichlorobenzene. Preferably, a concentration in the range of about 1 to about 10% by weight of the copolymer in solvent may conveniently be used for this conversion.

An excess of carboxylic compound over that stoichiometrically necessary to react with all the residual double bonds remaining in the diene portion of the selectively hydrogenated star polymer is typically employed. Preferably, at least 1 mole of carboxylic compound is used for each olefinic unsaturation present in the selectively hydrogenated star polymer, with equivalent ratios of carboxylic compound to olefinic double bonds of between about 1:1 and 2:1 being particularly suitable. However, less than stoichiometric amounts of carboxylic compound may also be used.

The above reaction may occur with or without the use of catalyst or radical initiators such as tertiary butyl hydroperoxide. Any excess carboxylic compound is typically removed by either vacuum distillation or through the use of a stripping gas stream.

In a preferred embodiment, the reaction of the carboxylic compound and star polymer takes place in the presence of chlorine. Chlorination has been disclosed with polymers of isobutene in U.K. Pat. No. 949,981. The molar amount of chlorine used is preferably such that the mixture of polymer and carboxylic compound is contacted with from 0.3 to 1.5, more preferably from 0.5 to 1.2 moles of chlorine for each mole of carboxylic compound. Insofar as the conversion of the polymer is concerned, there appears to be no lower limit on the amount of chlorine which may be used. In practice, however, it is preferred to remain within the aforesaid ranges.

Suitably the mixture of polymer and carboxylic compound is heated to the reaction temperature before it is contacted with the chlorine. The mixture is contacted with a molar deficiency of chlorine before any substantial amount, e.g., less than half of the carboxylic compound has reacted. Suitably, substantially none of the carboxylic compound has reacted. The rate of introduction of chlorine into the mixture may vary between wide limits but is preferbly such that it equals the rate of chlorine uptake. Usually the chlorine is introduced over a period of from 0.5 to 10 hours, preferably from 3 to 7 hours.

After the chlorination treatment, it is advantageous to subject the resultant product mixture to a post-reaction or thermal treatment. This thermal treatment is suitably carried out at a temperature in the range of from 140° to 220° C, preferably from 160° to 210° C. The conditions are usually such, e.g., reflux conditions, that substantially no part of the product mixture is removed during this thermal treatment. The thermal treatment may be for 0.1 to 20 hours, but is preferably from 0.5 to 10 hours. Longer periods tend to increase the formation of tarry by-products.

The star polymer may also be chlorinated before reaction with the alpha, beta-unsaturated carboxylic compound. In this case, the hydrogenated polymer is treated with about 0.5 to about 3 moles of chlorine ($Cl_2$) per 100 carbon atoms of the polymer, i.e., between about 2%w and 12%w $Cl_2$, in a suitable chlorination solvent. After a reaction period of from 0.5 to 2 hours at between 0° and 100° C, unreacted chlorine and hydrogen chloride are removed by gas stripping. The chlorination solvent may be exchanged by distillation with a second solvent such as a lube oil base stock or other solvent suitable for the subsequent steps as described herein.

The modified polymer is then reacted with an alkane polyol to form the oil-soluble product of the instant invention. The resulting esters of succinic acid and the like provide the dispersant function of the additive.

The alkane polyols useful in making the esters are alkane polyols having at least two and preferably at least four hydroxy groups such as the trihydroxyalkanes, e.g., ethylene glycol, propylene glycol, polymethylene glycols, trihydroxybutanes, pentanes, hexanes, heptanes, octanes, nonanes, dodecanes, etc., as well as tetrahydroxy alkanes, pentahydroxy alkanes, hexahydroxy alkanes, as well as the sugar alcohols such as erythritol, pentaerythritol, tetritols, pentitols, hexitols, mannitol, sorbitol, glucose and the like. Particularly preferred alcohols are pentaerythritol and mannitol. Especially preferred is pentaerythritol.

The molar ratio of polyol to carboxylic compound is typically between about 0.1:1 and about 2:1, preferably between about 0.5:1 and about 2:1, most preferably about 1:1. The conditions during esterification are typically about 150° to 250° C for between about 1 hour and 20 hours.

In both reaction steps it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess polyol is employed, then it may be desirable to remove the excess. One means of doing this is to first exchange the trichlorobenzene solvent for a lube base stock by vacuum distillation, and then add a volume of heptane equal to the volume of oil solution. Then an equal volume of methanol is added and mixed. Two separate layers are therein formed upon settling; one layer comprising predominantly wash solvent and the unreacted polyol, and a second layer comprising predominantly oil, heptane, and the additive product. After separating the wash layer, the volatiles present in the product layer can then be removed by a distillation technique. Alternatively, the excess polyol may be removed under a vacuum or with a stripping gas stream.

The reaction product of this invention can be incorporated in lubricating oil compositions, e.g., automotive crankcase oils, in concentrations within the range of about 0.1 to about 15, preferably about 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., diesel fuel, No. 2 fuel oil, etc., then usually about 0.001 to .5 weight percent, based on the weight of the total composition of the reaction product will be used. Concentrations comprising a minor proportion, e.g., 15 to 45 weight percent, of said reaction product in a major amount of hydrocarbon diluent, e.g., 85 to 55 weight percent mineral lubricating oil, with or without other additives present, can also be prepared for ease of handling.

In the above compositions or concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert-octylphenol sulfide, bis-phenols such as 4,4'-methylene bis(3,6-ditert-butylphenol), vixcosity index improvers such as the ethylene-higher olefin copolymer, polymethylacrylates, polyisobutylene, alkyl fumaratevinyl acetate copolymers, and the like as well as other ashless dispersants or detergents such as overbased sulfonates.

The invention is further illustrated by means of the following Illustrative Embodiment, which is given for the purpose of illustration alone, and is not meant to limit the invention to the particular reactants and amounts disclosed.

Illustrative Embodiment I

In Illustrative Embodiment I, a hydrogenated star-shaped polymer made from isoprene and a divinyl benzene coupling agent was reacted with maleic anhydride and pentaerythritol to form a dispersant/VI improver according to the present invention.

The star-shaped polymer was prepared by first polymerizing isoprene in a cyclohexane solvent with a secondary butyl lithium initiator. The polymer branch A-Li had a molecular weight of about 45,700. The living polymer was then coupled with commercial divinyl benzene (55% weight from Dow Chemical) in a molar ratio of divinyl benzene to lithium of 3:1. The coupled polymer had a total molecular weight of 577,000 on a polystyrene equivalent basis. Then the polymer was hydrogenated with an aluminum triethyl/nickel octoate catalyst. The final molecular weight was 609,000, the coupling yield was 96%, the saturation index was 10%, and residual unsaturation by ozone titration was 0.11 milliequivalents per gram.

Then 10 grams of the hydrogenated star-shaped polymer prepared above was dissolved in 190 grams 1, 2, 4-trichlorobenzene. To the polymer solution was added maleic anhydride (0.80g, 7.0 millimoles) and the mixture heated to 205° C for 4 hours. Excess maleic anhydride was removed by distillation under vacuum. A small part of the solvent also came over. A nitrogen atmosphere was maintained up until vacuum was applied.

Pentaerythritol (0.95 grams, 7.0 millimoles) was added to the maleated polymer solution and the mixture heated to 205° C for 4 hours under nitrogen. Unreacted pentaerythritol was removed by distillation under vacuum.

An amount of a lube base stock was added which was equal in volume to the reaction mixture and the trichlorobenzene solvent distilled under vacuum. The oil solution was then diluted with heptane, filtered, washed with methanol and stripped of volatiles.

Dispersant power of the oil-soluble product was readily apparent from the formation of a stable emulsion during the washing step. In addition, the dispersancy of the product was assessed by a Spot Dispersancy Test. In the Spot Dispersancy Test, one part of a 2% weight solution of the additive to be tested in 100 N oil is mixed with two parts used, sludge-containing oil and heated overnight at 150° C. Blotter spots are then made on filter paper and the ratio of sludge spot diameter to oil spot diameter is measured after 24 hours. A poor value is under about 50%. The additive prepared above yielded a value of 56%. Unmodified star polymer gave a value of about 27%.

A 2% by weight concentration of the above-prepared additive in a common mineral lubricating oil base stock increased the 210° F kinematic viscosity from 4 centistokes for the lube stock alone to 15 centistokes for the lube oil plus additive. This viscosity increase demonstrates the usefulness of the present additive as a VI improver.

What is claimed is:

1. The oil-soluble product prepared by the process comprising:
    a. reacting a selectively hydrogenated star-shaped polymer with an alpha-beta unsaturated carboxylic acid, anhydride or ester at a temperature of between about 150° C and about 300° C for between about 1 hour and about 20 hours wherein said star-shaped polymer comprises a poly (polyalkenyl coupling agent) nucleus and at least four polymeric arms linked to said nucleus wherein said polymeric arms are selected from the group consisting of:
        (i) hydrogenated homopolymers and hydrogenated copolymers of conjugated dienes;
        (ii) hydrogenated copolymers of conjugated dienes and monoalkenyl arenes; and
        (iii) mixtures thereof;
    and wherein at least about 80% of the aliphatic unsaturation of the starshaped polymer has been reduced by hydrogenation while less than 20% of the aromatic unsaturation has been reduced; and
    b. reacting the product of step (a) with an alkane polyol having at least two hydroxy groups at a temperature of between about 150° C and about 250° C.

2. A product, according to claim 1, wherein the number of polymeric arms is between about 7 and about 15.

3. A product, according to claim 1, wherein the polyalkenyl coupling agent is a polyvinyl aromatic compound.

4. A product, according to claim 1, wherein the polyalkenyl coupling agent is divinyl benzene.

5. A product, according to claim 1, wherein the number average molecular weight of each polymeric arm is between about 5,000 and about 150,000.

6. A product, according to claim 1, wherein the peak molecular weight of the hydrogenated star-shaped polymer is between about 100,000 and about 500,000.

7. A product, according to claim 1, wherein between about 90 and 98% of the aliphatic unsaturation has been reduced by hydrogenation.

8. A product, according to claim 4, wherein each polymeric arm is a hydrogenated polyisoprene homopolymer.

9. A product, according to claim 1, wherein said star-shaped copolymer and said carboxylic acid, anhydride or ester are reacted in the presence of a trichlorobenzene solvent in a ratio of moles of carboxylic acid, anhydride or ester to olefinic double bonds remaining in the selectively hydrogenated star-shaped polymer of between about 1:1 and about 2:1.

10. A product, according to claim 9, wherein said star-shaped polymer and said carboxylic acid, anhydride or ester are reacted in the presence of a trichlorobenzene solvent and chlorine in a molar ratio of chlorine to said carboxylic acid, anhydride or ester of between about 0.3:1 and about 1.5:1.

11. A product, according to claim 1, wherein the alkane polyol is pentaerythritol and the molar ratio of polyol to carboxylic acid, anhydride or ester is between about 0.5:1 and about 2:1.

12. A product, according to claim 1, wherein the product of step (a) is reacted with between about 0.5 and 3.0 moles of chlorine per 100 carbon atoms of the star-shaped polymer prior to reaction with the alkane polyol.

13. A lubricating composition comprising a major amount of a lubricating oil and from 0.1 to about 15.0 weight percent of the oil-soluble product of claim 1.

14. A concentrated lubricating composition comprising a lubricating oil and from 15 to 45 weight percent of the oil-soluble product of claim 1.

* * * * *